Patented Sept. 29, 1936

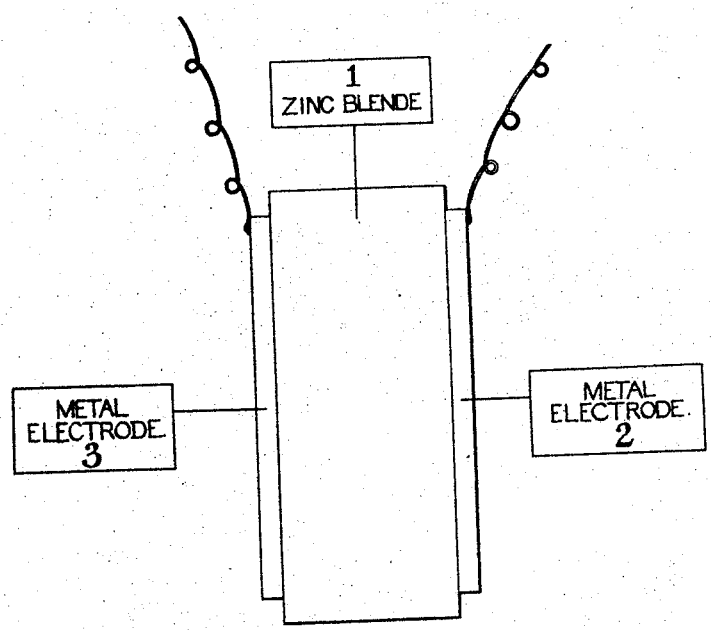

2,055,584

UNITED STATES PATENT OFFICE 2,055,584

LIGHT VALVE

Franz v. Okolicsanyi, Nuremberg, Germany, assignor to Suddeutsche Telefon - Apparate - Kabelund Drahtwerke, Aktiengesellschaft Tekade, Nuremberg, Germany Application February 12, 1934, Serial No. 710,962
In Germany February 22, 1933

1 Claim. (Cl. 88—61)

This invention relates to a method of and means for controlling the beam of light of a constant source of light for television and talking film recording purposes. The known controlling device with a Kerr cell with nitro benzene, which was hitherto regarded as the only effective means independent of frequency for such purposes, has a number of disadvantages which are more particularly due to the fact that this liquid has a relatively uncertain insulation resistance and furthermore involves the employment of very high control voltages. In order to obtain useful variations in luminosity, the available range of control must be utilized up to the vicinity of the breakdown voltage. This necessity forms a constant source of danger for the reliable and steady functioning of the light-control apparatus and therefore necessitates constant supervision of the arrangement.

These disadvantages are overcome according to the invention through the employment as the light-controlling body of certain crystals which show a direct electro-optical double refraction which is proportional to the field. As is well known there are crystals which are isotropic or anisotropic as regards their optical properties. In the former the rate of propagation of the light is the same in all directions in which it passes through. It can be influenced by electric action only when using extremely high voltages. For light control purposes this group is therefore just as useless as the amorphous bodies. Anisotropic crystals on the other hand, owing to the different speed of propagation in different directions, may have both a natural and an electrically produced double refraction. In the substances used for crystallographic tests the electro-optical effect is found to be only very slight. In the quartz and calc-spar crystals used almost exclusively for practical purposes, direct electro-optical double refraction does not occur. While double refraction can be produced by mechanical deformations, this indirectly produced effect is unsuitable for television purposes, owing to its dependence on frequency.

The light control cell provided by this invention consists of a crystal of natural zinc blende arranged between two plate electrodes. Zinc blende has only one optical axis, and in the cell provided by this invention this axis is arranged perpendicular, or parallel, to the controlling field of force. Zinc blende is transparent in the visible spectrum range and electrically insulating. Its action depends on the direct electrical double refraction, which is without lag and is dependent on the frequency. These properties make the cell proposed particularly suitable for television and optical sound recording purposes. A further advantage of crystal cells with zinc blende is the fact that, compared with other cells, very low tensions suffice for promoting their control effect.

The rest of the light control apparatus is the same as in the case of the known Kerr cell arrangement, so that detailed description of the various parts necessary to complete the crystal cell arrangement is unnecessary.

The accompanying drawing shows schematically an elevation view of a cell according to this invention. The plate of zinc blende is indicated by 1, whilst 2 and 3 denote electrodes of metal plate.

What I claim is:

A cell for controlling the beam of light from a constant light source for television purposes and talking film recording, consisting of a plate of light-transmitting natural zinc blende crystal, on which the light beam impinges, having two opposite surfaces between which the light beam passes with an electrode in contact with each of said surfaces for producing a controlling field of force in the region of the crystal traversed by the light beam, said crystal having its optical axis perpendicular to the direction of said field of force.

FRANZ v. OKOLICSANYI.